Oct. 25, 1966 L. C. CARDINAL ETAL 3,280,621
OMNI-DIRECTIONAL ULTRASONIC SEARCH UNIT
Filed Oct. 28, 1963

INVENTORS
LOUIS C. CARDINAL
STEPHEN D. HART

BY
ATTORNEY

[Patent] 3,280,621
Patented Oct. 25, 1966

3,280,621
OMNI-DIRECTIONAL ULTRASONIC SEARCH UNIT
Louis C. Cardinal, Temple Hills, Md., and Stephen D. Hart, Alexandria, Va., assignors to the United States of America as represented by the Secretary of the Navy
Filed Oct. 28, 1963, Ser. No. 319,615
4 Claims. (Cl. 73—67.8)

The invention described herein may be manufactured and used by or for the Government of the United States of America for governmental purposes without the payment of any royalties thereon or therefor.

The present invention relates to an omnidirectional ultrasonic search mechanism and more particularly to a search mechanism having several transducers arranged in a holding head capable of being spun.

Prior art devices employing transducers for detecting flaws or imperfections, did not provide a complete directional coverage of the area checked, but provided coverage in one direction only. In order to cover all directions in a large area using prior art devices, a minimum number of 18 inspections is required in order to obtain complete directional coverage, an operation which is both costly and time consuming.

The present invention is a device which ultrasonically and nondestructively detects both internal and external defects in metals and other solids in the shortest possible time without regard to the direction or orientation of the defect.

An object of the present invention is the provision of a detection system for detecting major and minor flaws in metals and other solids being used at stress levels close to the ultimate strength.

Another object is the provision of a plurality of transducers in a novel arrangement for detecting flaws in metals and other solids.

Another object is to provide a method of nondestructively detecting imperfections in metals and other solids.

A further object is the provision of a method for detecting imperfections in sheet metal plates with a minimum of interruption in production flow.

Still another object is to provide a method of detecting metal imperfections using a plurality of transducers.

A final object is the provision of a method of detecting imperfections in metal and other solids wherein the device will provide approximately one-hundred percent coverage of the area being checked.

Other objects and advantages of the invention will hereinafter become more fully apparent from the following description of the annexed drawings, which illustrate a preferred embodiment and wherein.

The invention entails the spinning of a head containing a plurality of transducers, a result of which a spot of acoustic energy is directed upon a solid object tested, wherein the energy will be returned to the transducer and registered or recorded as a trace if a flaw is detected.

Figure 1:
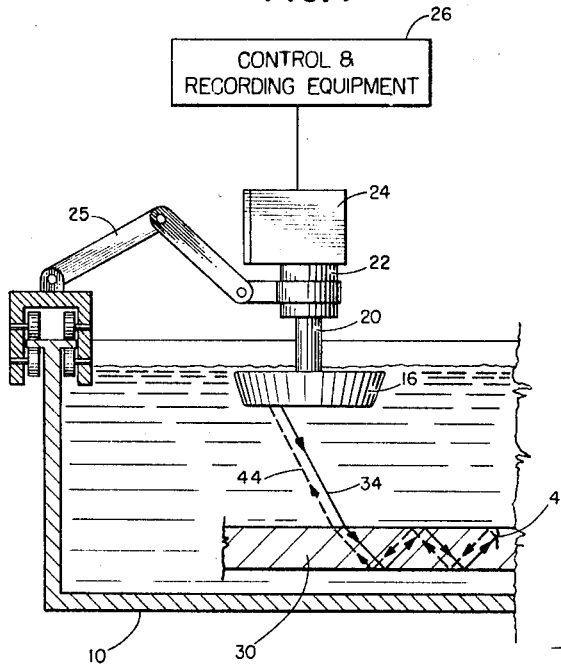
FIG. 1 is a schematic of the invention, showing the test apparatus in a testing environment, and illustrating the path a beam follows prior to and after a defect or flaw is detected.
Figure 2:
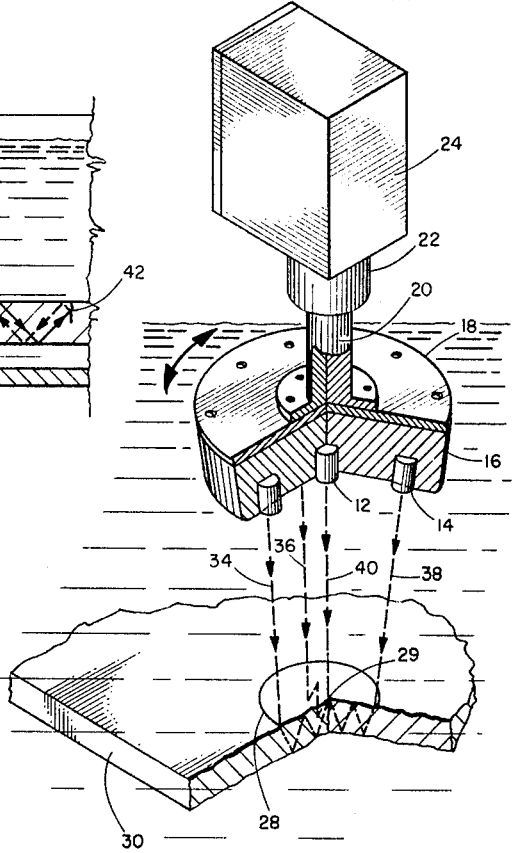
FIG. 2 is an oblique cut away view, showing the location of the plurality of transducers in a holding head, and showing the travel of energy from a transducer to provide complete directional coverage.
Figure 3:
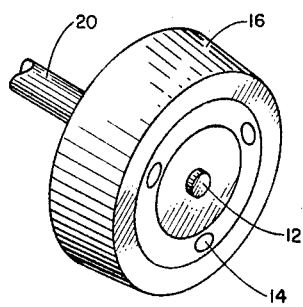
FIG. 3 shows the holding head having a plurality of transducers in the preferred arrangement.

Referring now to the drawings in detail, wherein like reference characters designate like or corresponding parts throughout the several views, there is shown in FIG. 1, a schematic including tank 10, containing a liquid such as water, oil or the like, with said liquid acting as a medium for the transfer of the beam of acoustic energy emitting from transducers 12, 14 shown more clearly in FIG. 2.

Referring to FIG. 2, the preferred embodiment of the invention is shown containing a transducer holding tub member 16 having a plate 18 which may be bolted, welded or attached to tub member 16 by any convenient manner, and which serves as an easy access to the transducers carried by the tub or transducer holding means. Transducer holding tub 16 is constructed of aluminum having a diameter of approximately twelve inches, wherein it is understood that the member 16 could be made of any material, and further, the size is limited only by the conditions of use. Attached to plate member 18 by bolts or the like, is a shaft 20 which fits into housing 22 attached to the drive and control means 24.

Drive means 24 may be of any conventional type such as an electric motor attached to a gear train or belt which in turn drives shaft 20, but should be capable of turning shaft 20 at workable or required speeds up to 5700 r.p.m. Actually a speed of 600 r.p.m. has been found to be the practical speed at which to spin shaft 20 which in turn spins tub 16 the operation of which will be more fully described later. Drive means 24 is attached to a moveable arm or traveling bridge and carriage arrangement 25 wherein the device can be moved over the object tested either manually or automatically.

Electrically connected to drive means 24 is an electrical recording apparatus 26, which is also of the conventional type, but such apparatus must be capable of recording signals from the transducers at a desirable rate of 1200 p.p.s. or greater, which is required for best operation of the invention. Member 26 contains all the conventional electrical equipment for gating, pulsing, and receiving return signals from the transducers and is not considered to be part of the present invention.

Mounted on the axis of tub 16 is a lithium sulfate transducer 12, which acts as a surface reference finder, and further provides a signal strong enough to trigger the gating circuit in the recording device so as to provide a ready reference point for the evaluation of returned signals. Also mounted on member 16 and at intervals of 120° about the axis of transducer 12 with their axis at an angle of 20° to the vertical and at approximately a radius of 2.5 inches from the axis are three additional lithium sulfate transducers 14. Each of transducers 14 are positioned such that their outputs are directed toward a point on a line along the axis of transducer 12 and on the output side thereof. Wherein the transducers generate a compressional wave to the surface of the object tested and thereby set up transverse waves in the object and further, outline the area on plate 30 that is to be interrogated by beam spot 28. All four of the transducers used, can be either circular, rectangular or of any convenient design.

In operation, drive mechanism 24, through shaft 20, drives the transducers held by tub 16 at a speed of 600 r.p.m. and at an instrument pulse repetition rate of 1200 p.p.s. with each of the transducers swinging through an angle of 3° between pulses which indicates that only 3° of beam spot 28 may not be covered between pulses, which is not excessive. As is shown, the transducers send out rays of energy such as at 34, 36, 38 and 40 with the energy creating a vibration in plate 30 which bounces between the top and bottom of the plate wherein this effect continues until all the energy is dissipated, or a defect such as that at 42, shown in FIG. 1, is detected. The transducers can be varied in height over the plate being tested in order to vary the circle sizes and thus bounces in the plate. As the distance between the plate and the transducers increases, the circle size decreases, as well as the number of bounces set up in the plate. From this it can be seen that only a very small area could be checked. Upon detecting a defect, a significant portion or all of the wave is reflected back along approximately the same path 44 to the transducer originally sending out the ray. The signal is picked up by the transducer acting as both a transmitter and receiver, and in turn is projected on a cathode ray tube, or graph readout mechanism. It is understood, that each transducer performs a similar flaw detection function as the transducer just described and of course it can be seen that since member 16 is spinning so are the transducers and thus an area such as spot 28 can be covered by numerous rays in a very short time. Since the device is rotating, circle area 28 could be interrogated several times before the device is moved thereby giving added assurance that the areas has been completely checked. It can further be seen that any flaw in circle 28 regardless of its orientation in plate 30, will eventually be struck at a near perpendicular angle, the best angle and clearest angle of detection, by one of the beams and thus be detected. The best or ultimate area of indication of a flaw would be at the point of convergence 29, of all the rays.

As was stated earlier, the device is mounted on a moveable arm or carriage 25, therefor complete plate inspection coverage can be accomplished merely by moving the carriage across the plate until it has been completely transversed. If a scan speed of 18 inches/seconds were used, at a forward index of 1/16 inch, a plate 170" x 50" could be inspected for both external and internal defects, with some of the defects detected being as small as 0.005 inch deep by 0.25 inch long in a steel plate 0.310 thick. This was accomplished in approximately 2.2 hours, which is a marked improvement over the prior art. Also, it is only necessary to cover an area once as contrasted to 18 different times required by the prior art.

Obviously many modifications and variations of the present invention are possible in the light of the above teachings. It is therefore to be understood that within the scope of the appended claims the invention may be practiced otherwise than as specifically described.

What is claimed is:

1. An apparatus for nondestructive flaw detection of bodies comprising;
   a transducer holding member,
   a plurality of transducers capable of transmitting acoustic energy,
   said transducers being equangularly disposed in said holding member equidistant from an axis through said holding member with each of said transducers inclined at the same angle with their outputs directed toward a point below said holding member on a line along the axis of said holding member,
   drive means for rotating said holding member about its axis,
   shaft means connecting said drive means and the transducer holding member whereby the drive means rotates the holding member creating a focused spot of energy from said transducers upon a body, creating shear waves in said body and wherein upon said shear waves encountering a flaw said energy is returned to said transducers, and
   detection means for displaying the energy returned to the transducers as an unsymmetrical graph.

2. The apparatus according to claim 1, wherein the transducer holding member is circular and has one transducer disposed along its axis and a plurality of transducers arranged symmetrically between the center transducer and the periphery of said member.

3. The apparatus according to claim 2 wherein said plurality of transducers are inclined with their axis at an angle relative to the axis of said center transducer, and are arranged at intervals of one hundred twenty degrees around said holding member.

4. The apparatus according to claim 1 in which there are at least three transducers disposed about the axis of said holding member.

References Cited by the Examiner
UNITED STATES PATENTS

| | | | |
|---|---|---|---|
| 2,893,239 | 7/1959 | Renaut | 73—67.7 |
| 3,086,195 | 4/1963 | Halliday | 73—67.8 X |
| 3,090,030 | 5/1963 | Schuck | 73—67.8 X |
| 3,140,600 | 7/1964 | Howry | 73—67.7 |
| 3,192,418 | 6/1965 | Sansom | 73—67.8 X |
| 3,209,582 | 10/1965 | Greenberg | 73—67.8 |
| 3,228,231 | 1/1966 | Joy | 73—67.7 |

RICHARD C. QUEISSER, *Primary Examiner.*

JAMES J. GILL, *Examiner.*